United States Patent [19]

Arippol

[11] 4,306,856
[45] Dec. 22, 1981

[54] PRE-HEATING APPARATUS FOR A THERMOFORMING MACHINE

[76] Inventor: Raimondo Arippol, Avenida dos Autonomistas, 1.117-Osasco, Sao Paulo, Brazil

[21] Appl. No.: 75,758

[22] Filed: Sep. 14, 1979

[51] Int. Cl.³ .............................................. F27B 9/28
[52] U.S. Cl. ...................... 432/8; 264/234; 432/59
[58] Field of Search ...................... 432/8, 59; 264/234, 264/235

[56] References Cited

U.S. PATENT DOCUMENTS

| | | | |
|---|---|---|---|
| 2,218,354 | 10/1940 | Keller | 432/8 |
| 2,441,500 | 5/1948 | Miess | 432/8 |
| 3,188,066 | 6/1965 | Nordberg et al. | 432/8 |
| 3,476,840 | 11/1969 | Glassford | 432/8 |

FOREIGN PATENT DOCUMENTS 50-160376 12/1975 Japan .................................. 264/234

Primary Examiner—John J. Camby
Attorney, Agent, or Firm—Ostrolenk, Faber, Gerb & Soffen

[57] ABSTRACT

There is disclosed a pre-heating apparatus for a thermoforming machine for uniformly heating a thermoplastics sheet or plate throughout, the apparatus comprising a first heating section (A), a cooling section (B) and a further heating section (C). Such arrangement ensures that both the outer and inner layers of the thermoplastics sheet or plate (1) are all at the same temperature when the sheet or plate is subjected to a thermoforming process. There is also disclosed a process for pre-heating a thermoplastics sheet or plate prior to subjecting such sheet or plate to a thermoforming process comprising firstly passing a sheet or plate through a heating section, thereafter through a cooling section and finally through a further heating section. The first heating section and the cooling section are preferably arranged vertically and the further heating section being arranged horizontally, the thermoplastics sheet or plate passing upwardly through the first heating section and downwardly through the cooling section.

10 Claims, 2 Drawing Figures

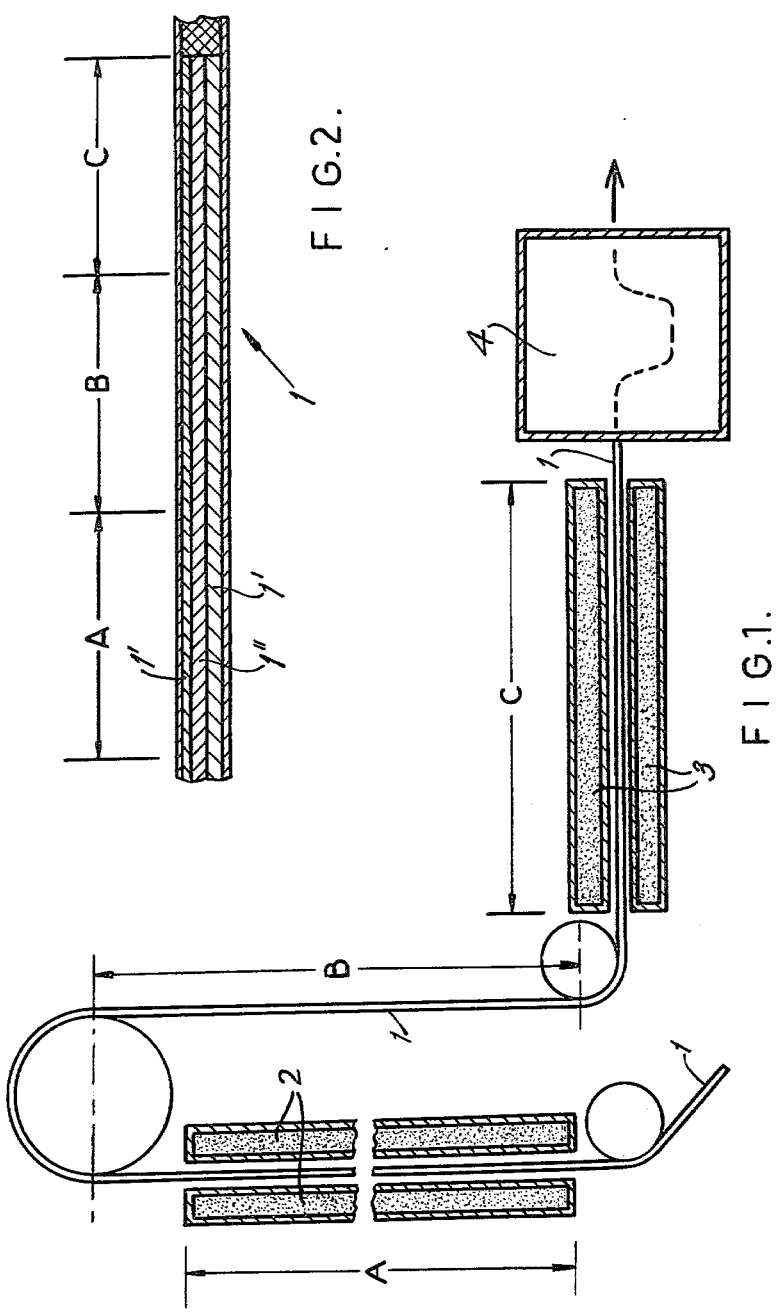

PRE-HEATING APPARATUS FOR A THERMOFORMING MACHINE

The present invention relates to improvements in thermoforming machines, particularly in such machines which work with thermoplastics sheet material, such as polypropylene. It is an object of the invention to increase the capacity of such machines by producing a uniform temperature throughout the thermoplastics sheet.

Known thermoforming machines are characterized by a final product in which, after a number of operations, the thermoplastics sheet attains a high temperature and is ready for the thermoforming process. It is, however, very common that the heated sheets do not receive a uniform temperature throughout, due to the fact that only the outer layers of the sheet reach an adequate temperature, the inner layers not reaching a sufficient temperature.

Generally, it is desired that the thermoplastics sheet has a uniform temperature throughout both for a better sheet utilization as well as for an improved final product.

It is an object of the present invention to provide a sheet pre-heating apparatus for a thermoforming machine which at least minimizes the above-mentioned disadvantage regarding attaining a uniform temperature throughout the thermoplastics sheet.

According to the present invention, there is provided a pre-heating apparatus for a thermoforming machine for uniformly heating a thermoplastics sheet or plate throughout, such apparatus comprising a heating section, followed by a cooling section and then a further heating section.

Preferably, the pre-heating apparatus of the invention comprises a vertical heating section, followed by a vertical cooling section and then a further horizontal heating section.

Also in accordance with the present invention there is provided a process for pre-heating a thermoplastics sheet or plate prior to subjecting such sheet or plate to a thermoforming process, comprising firstly passing the sheet or plate through a heating section, thereafter passing the sheet or plate through a cooling section and finally passing the sheet or plate through a further heating section.

Preferably, such process comprises firstly passing the sheet or plate vertically upwards through a heating section, thereafter passing the sheet or plate vertically downwardly through a cooling section and finally passing the sheet or plate horizontally through a further heating section.

The invention will be further illustrated, by way of example, with reference to the accompanying drawings, in which:

FIG. 1 is a schematic view of passage of a thermoplastics sheet through the pre-heating arrangement of the invention, prior to thermoforming; and FIG. 2 is a section through a thermoplastics sheet indicating the changes which take place as the sheet passes through the various heating and cooling sections.

As illustrated in FIG. 1, a thermoplastics sheet or plate 1, is initially passed vertically upwards through section (A) and between heaters 2, the said sheet or plate thereafter descending vertically through a cooling section (B) and then travelling horizontally through section (C) and between heaters 3. Only after such heat treatment is the sheet passed into the countermould 4.

As can be seen in FIG. 2, in the section (A) the outer layers 1' of the sheet are heated to a temperature of, for example, approximately 120° C., while the inner layer 1" only reaches a temperature of, for example, approximately 100° C. In the section (B), with a normal or forced cooling, the temperature of the outer layers 1' falls to approximately 70° C., whilst the inner layer 1", on cooling more slowly, falls to approximately 90° C. As the sheet passes between the heaters of section (C), and as the outer layers 1' are subjected to a more rapid heating than the inner layer, the temperature of all layers reaches approximately 140° C., thereby creating ideal thermoforming conditions, when the sheet is passed into countermould 4.

I claim:

1. A pre-heating apparatus for a thermoforming machine for uniformly heating a thermoplastics sheet or plate throughout, such apparatus comprising feed means for advancing the sheet or plate through a series of sections; a heating section including heating means for supplying heat to the exterior of the sheet or plate, thereby to heat the plate; the heating means cooperating with the feed means for causing the exterior of the sheet or plate to be heated above the temperature of the interior of the sheet or plate and for then advancing the sheet or plate out of the heating section; a cooling section following the heating section and adapted to cool the sheet or plate by cooling the exterior thereof; the feed means being adapted to advance the sheet or plate out of the cooling section after the exterior of the sheet or plate had cooled to a temperature below the temperature of the interior of the sheet or plate and a further heating section following the cooling section and including further heating means for supplying heat to the exterior of the sheet or plate, thereby to heat the sheet or plate; the feed means advancing the plate or web through the sections in the recited sequence.

2. A pre-heating apparatus as claimed in claim 1, wherein the heating section and the heating means therein are oriented vertically such that the sheet or plate is advanced vertically through the heating section; the cooling section is oriented vertically such that the sheet or plate moves vertically through the cooling section; and the further heating section and the heating means therein are oriented horizontally such that the sheet or plate moves horizontally through the further heating section; the feed means including means for directing the sheet or plate to move vertically through the heating section, vertically through the cooling section and horizontally through the further heating section.

3. A pre-heating apparatus as claimed in claim 2, wherein the feed means is adapted for feeding the sheet or plate vertically up through the heating section and vertically down through the cooling section.

4. A pre-heating apparatus as claimed in either of claims 1 or 2 wherein the heating means includes heaters at the opposite sides of the sheet or plate moving through the heating section and the further heating means also includes heaters at the opposite sides of the sheet or plate moving through the further heating section.

5. A pre-heating apparatus as claimed in either of claims 1 or 2, wherein the heating means cooperates with the feed means for causing the exterior of the sheet or plate to be heated to a temperature of approximately 120° C.

6. A process for pre-heating a thermoplastics sheet or plate prior to subjecting such sheet or plate to a thermoforming process, comprising firstly passing the sheet or plate through a heating section and supplying heat there to the exterior of the sheet or plate for heating both the exterior and the interior of the sheet or plate; thereafter passing the sheet or plate through a cooling section for cooling the sheet or plate by cooling the exterior thereof, and retaining the sheet or plate in the cooling section for a period of time sufficient at least to cool the exterior of the sheet or plate with respect to the interior of the sheet or plate such that the positive temperature differential between the exterior and the interior of the sheet or plate is greater in the heating section than in the cooling section, and the period of time being short enough that the interior of the sheet or plate remains heated; and finally passing the sheet or plate through a further heating section for again supplying heat to the exterior of the sheet or plate, thereby to heat both the exterior and the interior of the sheet or plate to respective higher temperatures.

7. A process for pre-heating a thermoplastics sheet or plate as claimed in claim 6, comprising firstly passing the sheet or plate vertically upwards through the heating section, thereafter passing the sheet or plate vertically downwardly through the cooling section, and finally passing the sheet or plate horizontally through the further heating section.

8. A process for pre-heating a thermoplastics sheet or plate prior to subjecting such sheet or plate to a thermoforming process, comprising firstly passing the sheet or plate through a heating section and supplying heat there to the exterior of the sheet or plate for heating both the exterior and the interior of the sheet or plate, such that the temperature at the exterior of the plate has been raised to a higher level than the temperature at the interior of the plate; thereafter passing the sheet or plate through a cooling section for cooling the sheet or plate by cooling the exterior thereof, and retaining the sheet or plate in the cooling section for a period of time sufficient at least to cool the exterior of the sheet or plate to a temperature below the temperature at the interior of the sheet or plate, and the period of time being short enough that the interior of the plate remains at a higher temperature than the exterior of the plate; and finally passing the sheet or plate through a further heating section for again supplying heat to the exterior of the sheet or plate, thereby to heat both the exterior and the interior of the sheet or plate to respective higher temperatures.

9. A process for pre-heating a thermoplastics sheet or plate as claimed in either of claims 6 or 8, wherein in the heating section, heat is supplied to the exterior of the sheet or plate at the opposite sides thereof and wherein in the further heating section, heat is also supplied to the exterior of the sheet or plate at the opposite sides thereof.

10. A process for pre-heating a thermoplastics sheet or plate as claimed in either of claims 6 or 8, wherein the heating section is adapted to supply heat to the exterior of the sheet or plate for elevating the temperature of the exterior to approximately 120° C.

* * * * *

REEXAMINATION CERTIFICATE (1535th)
United States Patent [19]
Arippol

[11] B1 4,306,856
[45] Certificate Issued  Aug. 27, 1991

[54] PRE-HEATING APPARATUS FOR A THERMOFORMING MACHINE

[76] Inventor: Raimondo Arippol, Avenida dos Autonomistas, 1.117-Osasco, Sao Paulo, Brazil

Reexamination Request:
No. 90/002,117, Aug. 27, 1990

Reexamination Certificate for:
Patent No.: 4,306,856
Issued: Dec. 22, 1981
Appl. No.: 75,758
Filed: Sep. 14, 1979

[51] Int. Cl.⁵ .............................. F27B 9/28
[52] U.S. Cl. ...................... 432/81; 432/59; 264/234
[58] Field of Search ............... 432/8, 59; 264/234

[56] References Cited
FOREIGN PATENT DOCUMENTS
7601340 12/1982 Brazil

*Primary Examiner*—Henry C. Yuen

[57] ABSTRACT

There is disclosed a pre-heating apparatus for a thermoforming machine for uniformly heating a thermoplastics sheet or plate throughout, the apparatus comprising a first heating section (A), a cooling section (B) and a further heating section (C). Such arrangement ensures that both the outer and inner layers of the thermoplastics sheet or plate (1) are all at the same temperature when the sheet or plate is subjected to a thermoforming process. There is also disclosed a process for pre-heating a thermoplastics sheet or plate prior to subjecting such sheet or plate to a thermoforming process comprising firstly passing a sheet or plate through a heating section, thereafter through a cooling section and finally through a further heating section. The first heating section and the cooling section are preferably arranged vertically and the further heating section being arranged horizontally, the thermoplastics sheet or plate passing upwardly through the first heating section and downwardly through the cooling section.

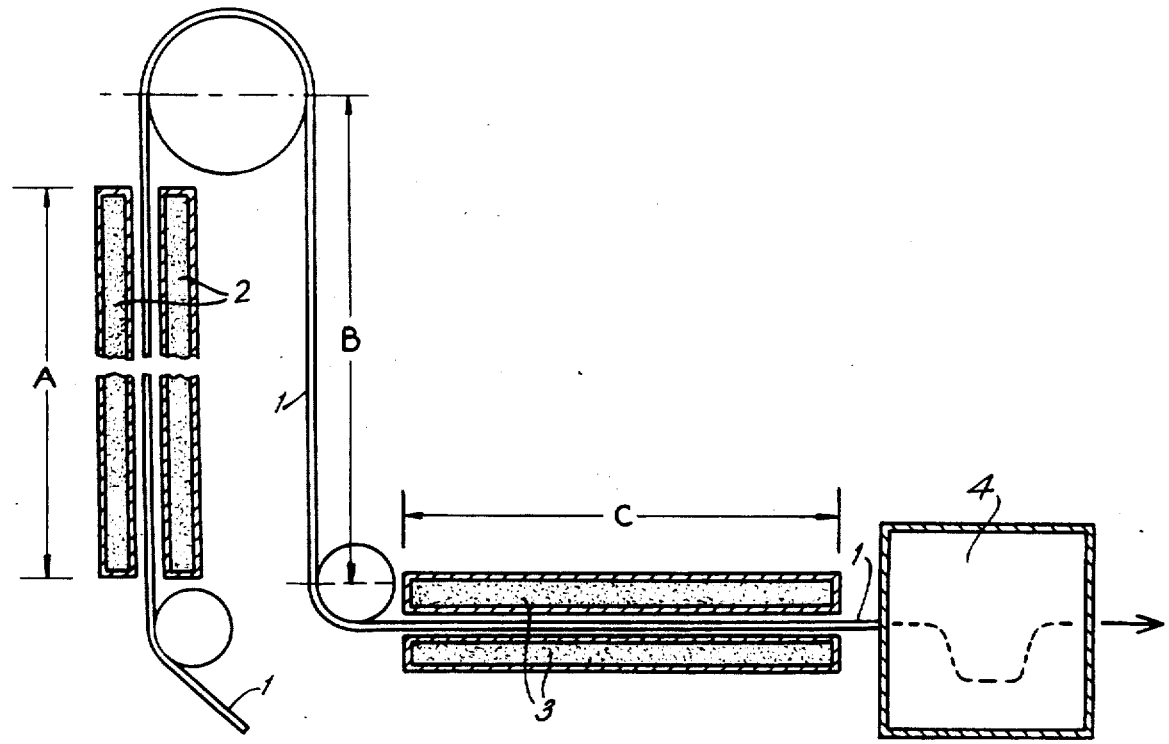

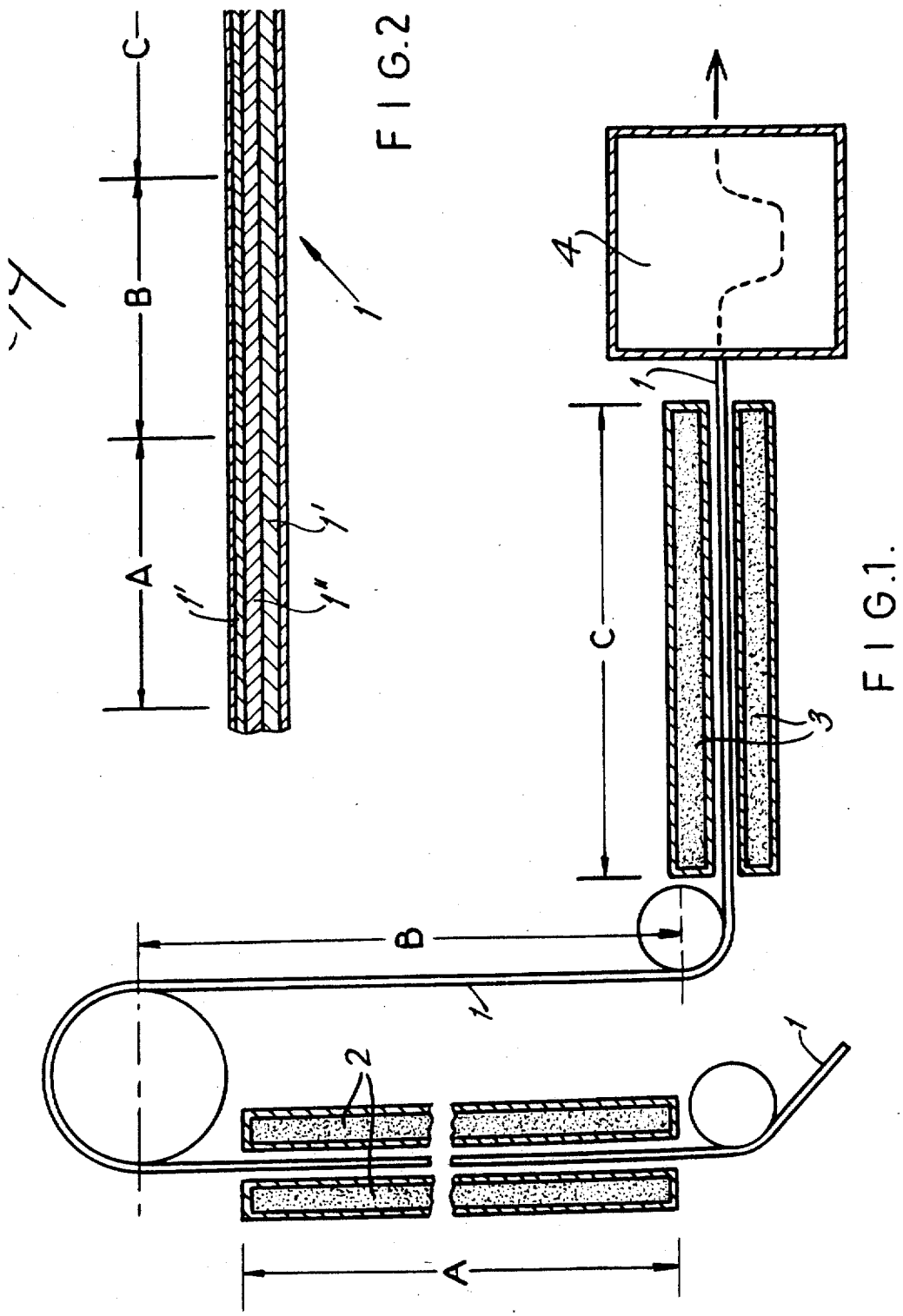

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *